United States Patent
Salter et al.

(10) Patent No.: US 9,539,939 B2
(45) Date of Patent: Jan. 10, 2017

(54) PHOTOLUMINESCENT LOGO FOR VEHICLE TRIM AND FABRIC

(71) Applicant: Ford Global Technologies, LLC, Dearborn, MI (US)

(72) Inventors: Stuart C. Salter, White Lake, MI (US); Cornel Lewis Gardner, Romulus, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 14/471,543

(22) Filed: Aug. 28, 2014

(65) Prior Publication Data

US 2015/0197186 A1    Jul. 16, 2015

Related U.S. Application Data (63) Continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.
*B60Q 3/02*    (2006.01)

(52) U.S. Cl.
CPC ........... *B60Q 3/0223* (2013.01); *B60Q 3/0283* (2013.01); *B60Q 3/0293* (2013.01)

(58) Field of Classification Search
CPC .... B60Q 3/0223; B60Q 3/0283; B60Q 3/0293
See application file for complete search history.

(56) References Cited

U.S. PATENT DOCUMENTS

| | | | |
|---|---|---|---|
| 5,709,453 A | 1/1998 | Krent et al. | |
| 6,031,511 A * | 2/2000 | DeLuca | G09G 3/22 345/55 |
| 6,117,362 A | 9/2000 | Yen et al. | |
| 6,494,490 B1 * | 12/2002 | Trantoul | B41M 1/18 101/211 |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — David V Bruce
(74) *Attorney, Agent, or Firm* — Vichit Chea; Price Heneveld LLP (57) ABSTRACT

An illumination apparatus for a vehicle is disclosed. The illumination apparatus comprises at least on fabric portion comprising a first photoluminescent portion having a first luminescent absorption range. The illumination apparatus further comprises a second photoluminescent portion having a second luminescent absorption range. A light source is configured to emit a first emission at a first wavelength directed toward the fabric portion, wherein the first wavelength is within the first absorption range and significantly outside the second absorption range.

20 Claims, 5 Drawing Sheets

(56) References Cited

U.S. PATENT DOCUMENTS

| | | |
|---|---|---|
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,128,848 B2 | 10/2006 | Pourdeyhimi et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,431,484 B2 | 10/2008 | Fong |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | La Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0087832 A1 | 4/2006 | Peng et al. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1* | 10/2009 | Folstad ............. B60Q 1/482 116/28 R |
| 2009/0262515 A1 | 10/2009 | Lee et al. |
| 2010/0003496 A1 | 1/2010 | Dias et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

PHOTOLUMINESCENT LOGO FOR VEHICLE TRIM AND FABRIC

CROSS-REFERENCE TO RELATED APPLICATIONS

This application is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, an illumination apparatus for a vehicle is disclosed. The illumination apparatus comprises at least on fabric portion comprising a first photoluminescent portion having a first luminescent absorption range. The illumination apparatus further comprises a second photoluminescent portion comprising a second luminescent absorption range. A light source is configured to emit a first emission at a first wavelength directed toward the fabric portion, wherein the first wavelength is within the first absorption range and significantly outside the second absorption range.

According to another aspect of the present invention, a lighting system configured to illuminate a fabric portion of a vehicle is disclosed. The lighting system comprises a light source configured to emit a first emission having a first wavelength. A thread treated with a photoluminescent material is disposed on a textile surface of the vehicle. The first emission is directed toward the thread such that the thread emits a second emission having a second wavelength.

According to yet another aspect of the present invention, a lighting system for a vehicle is disclosed. The lighting system comprises a controller in communication with a light source configured to emit a first emission having a first wavelength. A first thread treated with a first photoluminescent material is disposed on a textile surface of the vehicle, and the first emission is directed toward the first thread such that the thread emits a second emission having a second wavelength.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure which may be combined in various combinations and/or individually utilized to clearly reference various elements of the disclosure.

The following disclosure describes a lighting system for a vehicle configured to illuminate a trim portion or textile disposed on a surface or any form fabric or thread disposed in the vehicle. In some implementations, the system may be configured to selectively illuminate a portion of fabric, for example an embroidered portion of a seat in response to receiving a first emission of light from a light source. The portion of the fabric may correspond to material comprising a photoluminescent material and as such, may be referred to herein as a photoluminescent portion of the fabric.

The light source may be configured to emit light at a first wavelength or primary emission to excite the photoluminescent portion of the fabric. The photoluminescent material of the fabric portion may be configured to convert the first wavelength of the light into a second wavelength. The first wavelength of the light may correspond to a first color of light and the second wavelength may correspond to a second color of light, different from the first color. While the various implementations of the lighting apparatus described herein refer to specific structures demonstrated in reference to at least one automotive vehicle, it will be appreciated that the lighting apparatus may be utilized in a variety of applications.

Figure 1:
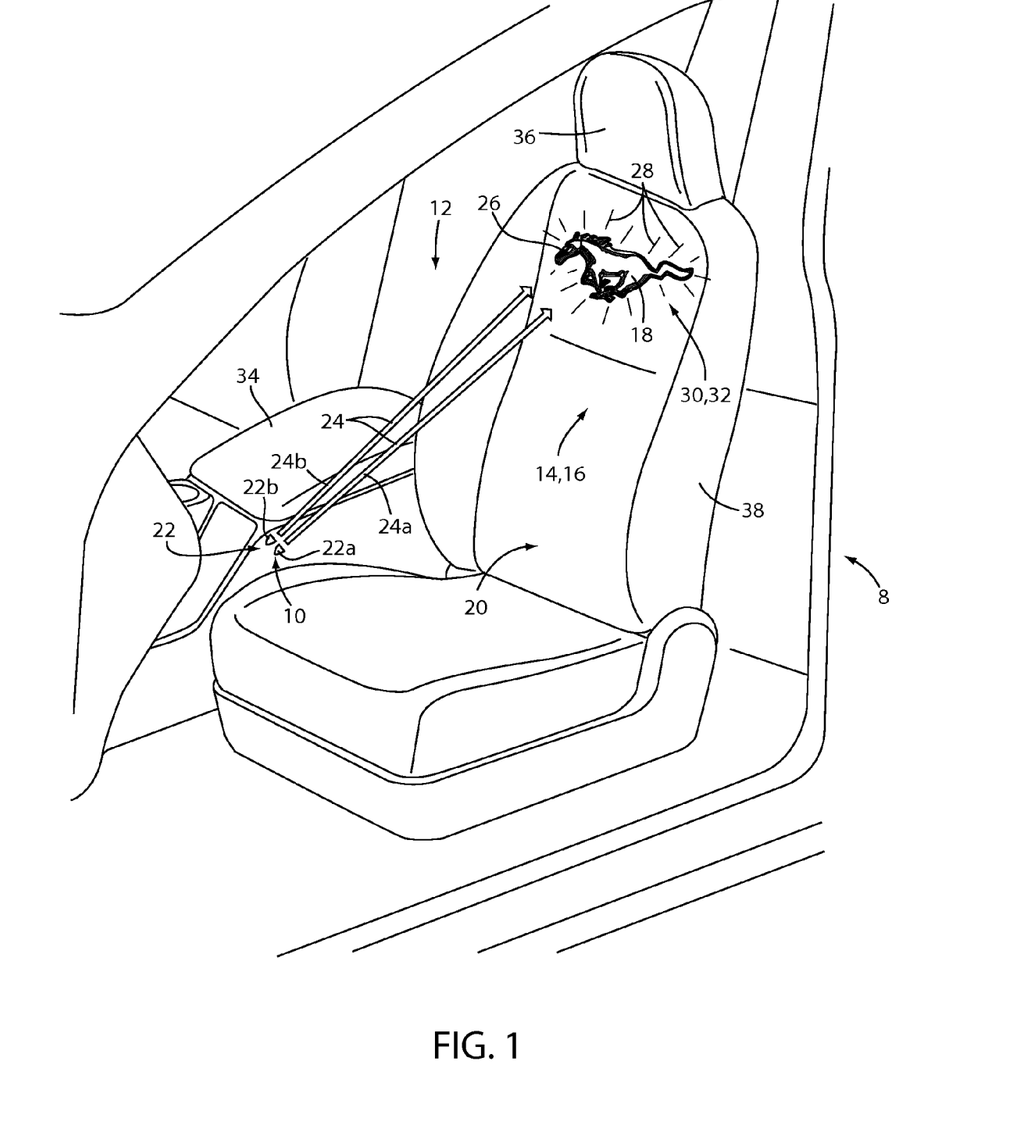
FIG. 1 is a perspective view of an automotive vehicle demonstrating a lighting system.

Referring to FIG. 1, a passenger compartment 8 of a vehicle is shown having a lighting apparatus 10. The lighting apparatus 10 may form a portion of a lighting system 12 configured to illuminate a trim portion or textile 14 disposed on a surface 16 of the vehicle or any form fabric or thread disposed in the vehicle. In some implementations, thread may form a fabric portion 18, which may be in the form of an embroidered logo or design disposed on a textile surface 20 of the vehicle. The textile surface 20 may correspond to any form of material formed from various materials and may comprise a fabric portion threaded, stitched, laminated, or otherwise disposed thereon. For example, a textile surface may comprise a variety of materials including leather, cloth, vinyl, leatherette, suede, plastic, and other materials that may be utilized in vehicles.

The lighting apparatus 10 comprises a light source 22 that may be controlled by one or more lighting controllers incorporated in the vehicle. A lighting controller of the vehicle may be configured to selectively activate the light source 22 in response to a variety of vehicle states. Examples of vehicle states may include a proximity detection of a key fob, a door lock actuation, an ignition sequence, gear selection, etc. The light source 22 may also be activated or deactivated by a switch or sensor, for example a toggle switch or proximity sensor.

The light source 22 is configured to emit a first emission 24 of light at a first wavelength. A first photoluminescent portion 26 may be disposed as a threaded portion of the fabric portion 18. Upon receiving the first emission 24, the first photoluminescent portion 26 may become exited and emit a second emission 28 having a second wavelength. The second wavelength may correspond to a different color than the first wavelength and may further correspond to a wavelength of light that is more acutely perceptible in the visual spectrum of light (e.g. a longer wavelength of light). In this configuration, the first photoluminescent portion 26 may provide for an ambient illumination in the vehicle that may serve to accent a portion of or illuminate the fabric portion in its entirety.

The first photoluminescent portion 26 may be applied to or utilized as a thread or integral component of the fabric portion 18. For example, the first photoluminescent portion 26 may correspond to a plurality of threads comprising at least one photoluminescent material that is dispersed, coated, bonded, deposited, or otherwise affixed thereto. In some implementations, the fabric portion may comprise one or more interconnected and/or laminated portions formed from individual pieces of fabric. In such implementations, the first photoluminescent portion 26 may be selectively applied to one or more specific pieces of fabric corresponding to the fabric portion 24. The fabric portion may also comprise a coating applied to the fabric forming the first photoluminescent portion 26.

In some implementations, the fabric portion 18 may further comprise a second photoluminescent portion 30. In response to receiving the first emission 24, the second photoluminescent portion 30 may also become excited and emit a third emission 32 having a third wavelength. The second photoluminescent portion 30 may similarly be implemented as a plurality of threads comprising at least one photoluminescent material that is dispersed, coated, bonded, deposited, or otherwise affixed to thereto. In some implementations, second photoluminescent portion 30 may correspond to one or more pieces of fabric or groupings of threads interconnected and/or laminated to the surface 16 proximate the first photoluminescent portion 26 and/or adjoining the first photoluminescent portion 26. The second photoluminescent portion 30 and the third emission 32 are designated generally in FIG. 1. An exemplary implementation of the fabric portion 18 is discussed in reference to FIGS. 5A-5C demonstrating the second photoluminescent portion 30 and the third emission 32.

The light source 22 is demonstrated as being mounted to a center console 34. In various implementations, the light source 22 may be located in a variety of locations in the vehicle and arranged such that the first emission 24 is directed to the fabric portion 18 and a corresponding photoluminescent portion. In some implementations, the light source 22 may be disposed on a vehicle interior roof or headliner, proximate a base of a headrest 36, a vehicle pillar, and/or the surface 16 of a passenger seat 38. A vehicle pillar as discussed herein may refer to a support extending from the roof of a vehicle to a lower body portion and may further serve as a vehicle frame for the windows of the vehicle.

In some implementations, the light source 22 may correspond to a plurality of light sources. In such implementations, each light source of the plurality of light sources may be located in different locations in the passenger compartment (e.g. a vehicle pillar) such that the first emission 22 may be increased in intensity and/or delivered from the plurality of locations. In this configuration, the first emission or an excitation emission may be delivered to one or more photoluminescent portions with a decreased (e.g. 26 and 30) visual acuity and also a lower likelihood of the first emission being blocked by an obstruction in the passenger compartment 8.

The first wavelength of the first emission 24 may correspond to a primary emission having a violet or deep blue color. The first wavelength may have a peak wavelength of approximately less than 500 nm. The second wavelength may correspond to one or more wavelengths of light corresponding to the second emission 28 having at least one wavelength greater than the first wavelength. In some implementations, the second wavelength may correspond to a plurality of wavelengths that may cause the second emission 28 to appear as significantly white light. In this configuration, the light emitted from the light source 22 at the first wavelength is configured to excite the first photoluminescent portion 26. In response to the excitation caused by the light at the first wavelength, the first photoluminescent portion 26 is configured to convert the first wavelength to emit the second emission 28 to illuminate the fabric portion and generate ambient lighting for the vehicle.

The first emission 24 emitted from the light source 22 at the first wavelength may correspond to a color of light that is less perceptible by the human eye compared to the second wavelength and the third wavelength. In this advantageous configuration, the first emission 24 emitted from the light source 22 at the first wavelength may be projected toward the second photoluminescent portion 30 without being visibly obvious to an operator of the vehicle 8 accessing the passenger compartment 8. This configuration may provide for the second emission 28 and the third emission 32 to be activated by the light source 22 projected from a remote location relative to the fabric portion 18. In this configuration, the lighting apparatus 10 is configured to provide lighting utility and/or accent lighting to illuminate the fabric portion 18.

Figure 2A:
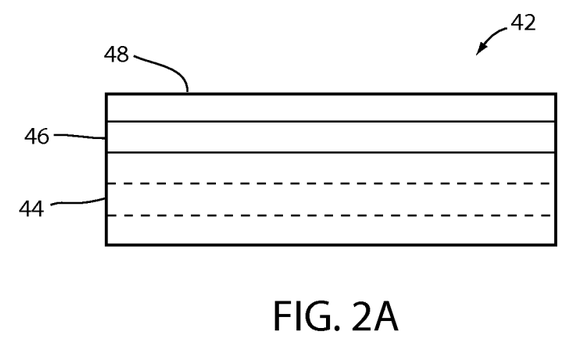
FIG. 2A illustrates a photoluminescent structure rendered as a coating.
Figure 2B:
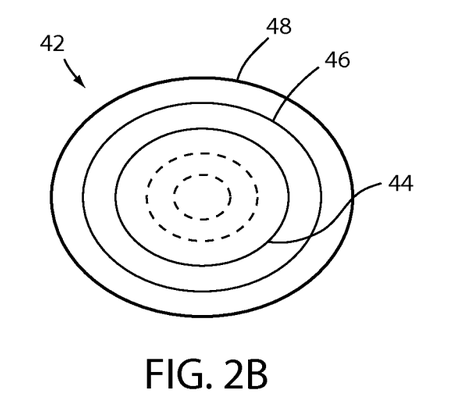
FIG. 2B illustrates the photoluminescent structure rendered as a discrete particle.
Figure 2C:
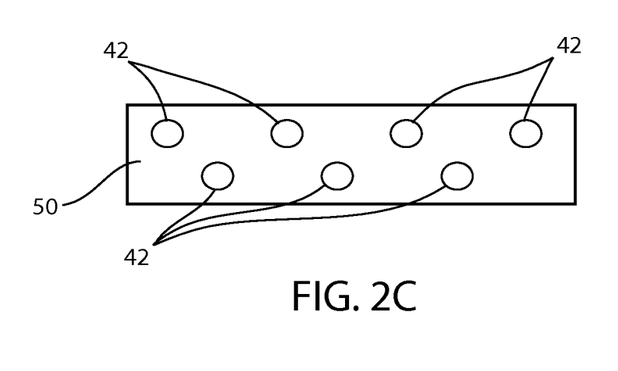
FIG. 2C illustrates a plurality photoluminescent structures rendered as discrete particles and incorporated into a separate structure.

Referring to FIGS. 2A-2C, a photoluminescent structure 42 is generally shown rendered as a coating (e.g. a film) capable of being applied to a fabric portion, a discrete particle capable of being implanted in a fabric portion, and a plurality of discrete particles incorporated into a structure capable of being incorporated in a fabric portion, respectively. The photoluminescent structure 42 may correspond to the photoluminescent portions as discussed herein, for example the first photoluminescent portion 26 and the second photoluminescent portion 30. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as a Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 42 comprising an energy conversion layer (e.g. conversion layer 44). The energy conversion layer 44 may be prepared by dispersing the photoluminescent material in a coating 50 to form a homogenous mixture using a variety of methods. Such methods may include preparing the energy conversion layer 44 from a formulation in a liquid carrier medium and coating the energy conversion layer 44 on a desired fabric portion of a vehicle. The energy conversion layer 44 coating may be deposited on a fabric portion by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a coating 50 to provide the energy conversion layer 44. The coating 50 may be formed as a portion of the fabric portion and/or, sprayed, sewn, woven, laminated or otherwise affixed to the fabric portion. In instances where one or more energy conversion layers 44 are rendered as particles, the single or multi-layered energy conversion layers 44 may be implanted into a fabric portion and/or disposed on specific threads to illuminate or accent the fabric portion. When the energy conversion layer 44 includes a multilayer formulation, each layer may be sequentially coated and affixed to the fabric portion.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protection layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Additionally, several layers may be combined by sequential coating, lamination, or embossing to form a substructure of the fabric portion. The substructure may then be laminated or embossed to form the integrated photoluminescent structure 42. Once formed, the photoluminescent structure 42 may be correspond to all or part of fabric portion to be affixed to the surface 16.

In some implementations, the photoluminescent structure 42 may be incorporated into a fabric portion as one or more particles as shown in FIG. 2C. The particles may be distributed throughout one or more threads of the fabric portion 18. The photoluminescent structure 42 may also be provided as one or more particles dispersed in a coating 50 that is subsequently applied to all or part of the fabric portion 18. The coating may correspond to an adhesive, polymer matrix, sealant, or any material composition configured to adhere the photoluminescent structure 42 to the fabric portion 18. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
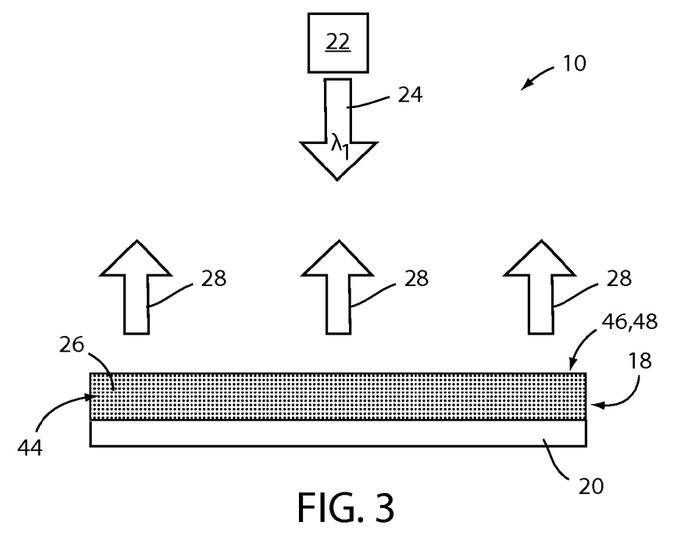
FIG. 3 is schematic view of a front-lit configuration of a lighting apparatus configured to convert a first wavelength of light to at least a second wavelength.

Referring to FIG. 3, the lighting apparatus 10 is generally shown according to a front-lit configuration 62. In this configuration, the first emission 24 emitted from the light source 22 is converted to a second emission 28 by the energy conversion layer 44. The first emission 24 comprises a first wavelength $\lambda_1$, and the second emission 28 comprises a second wavelength $\lambda_2$. The lighting apparatus 10 comprises the photoluminescent structure 42 disposed on all or part of the fabric portion 18, and in some implementations, the photoluminescent structure 42 may be disposed in a plurality of threads forming a photoluminescent portion. The photoluminescent structure 42 may be rendered as a coating and applied to a surface 16, for example the textile surface 20. The photoluminescent material may also be dispersed as a coating 50 and applied to all or part of the fabric portion 18 to form the photoluminescent portion.

In some implementations, the energy conversion layer 44 may further include the stability layer 46 and/or the protective layer 48. In response to the light source 22 being activated, the first emission 24 is received by the energy conversion layer 44 and converted from the first emission 24 having the first wavelength $\lambda_1$ to the second emission 28 having at least the second wavelength $\lambda_2$. The second emission 28 may comprise a plurality of wavelengths configured to emit any color of light from the first photoluminescent portion 26.

In various implementations, the lighting apparatus 10 comprises at least one photoluminescent material incorporated in the fabric portion 18 and is configured to convert the first emission 24 at the first wavelength $\lambda_1$ to the second emission 28 having at least the second wavelength $\lambda_2$. In order to generate the plurality of wavelengths, the energy conversion layer 44 may comprise one or more photoluminescent materials configured to emit the second emission 28 as wavelengths of light in the red, green, and/or blue color spectrums. Such photoluminescent materials may further be combined to generate a wide variety of colors of light for the second emission 28. For example, the red, green, and blue-emitting photoluminescent materials may be utilized in a variety of proportions and combinations to control the output color of the second emission 28.

Each of the photoluminescent materials may vary in output intensity, output wavelength, and peak absorption wavelengths based on a particular photochemical structure and combinations of photochemical structures utilized in the energy conversion layer 44. As an example, the second emission 28 may be changed by adjusting the first wavelength $\lambda_1$ of the first emission 24 to activate the photoluminescent materials at different intensities to alter the color of the second emission 28. In addition to, or alternatively to the red, green, and blue-emitting photoluminescent materials, other photoluminescent materials may be utilized alone and in various combinations to generate the second emission 28 in a wide variety of colors. In this way, the lighting apparatus 10 may be configured for a variety of applications to provide a desired lighting color and effect for a vehicle.

To achieve the various colors and combinations of photoluminescent materials described herein, the lighting apparatus 10 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

The light source 22 may also be referred to as an excitation source and is operable to emit at least the first emission 24. The light source 22 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 24. The first emission 24 from the light source 22 may be configured such that the first wavelength $\lambda_1$ corresponds to at least one absorption wavelength of the one or more photoluminescent materials of the energy conversion layer 44. In response to receiving the light at the first wavelength $\lambda_1$, the energy conversion layer 44 may be excited and output the one or more output wavelengths, for example, the second emission having the second wavelength $\lambda_2$. The first emission 24 provides an excitation source for the energy conversion layer 44 by targeting absorption wavelengths of a particular photoluminescent material or combination thereof utilized therein. As such, the lighting apparatus 10 may configured to output the second emission 28 to generate a desired light intensity and color.

In an exemplary implementation, the light source 22 comprises an LED configured to emit the first wavelength $\lambda_1$ which may correspond to a blue spectral, violet, and/or ultra-violet color range. The blue spectral color range comprises a range of wavelengths generally expressed as blue light (~440-500 nm). In some implementations, the first wavelength $\lambda_1$ may comprise a wavelength in the ultraviolet and near ultraviolet color range (~100-450 nm). In an exemplary implementation, $\lambda_1$ may be approximately equal to 470 nm. Though particular wavelengths and ranges of wavelengths are discussed in reference to the first wavelength $\lambda_1$, the first wavelength $\lambda_1$ may generally be configured to excite any photoluminescent material.

In an exemplary implementation, the first wavelength $\lambda_1$ may be approximately less than 500 nm. The blue spectral color range and shorter wavelengths may be utilized as an excitation source for the lighting apparatus 10 due to these wavelengths having limited perceptual acuity in the visible spectrum of the human eye. By utilizing shorter wavelengths for the first wavelength $\lambda_1$, and converting the first wavelength with the conversion layer 44 to at least one longer wavelength, the lighting apparatus 10 creates a visual effect of light originating from the photoluminescent structure 42 of the fabric portion 18.

As discussed herein, each of the plurality of wavelengths corresponding to the second emission 28 and the third emission 32 may correspond to a significantly different spectral color ranges. The second wavelength $\lambda_2$ may correspond to a plurality of wavelengths configured appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength $\lambda_1$ and approximately 430-525 nm in one embodiment. The plurality of wavelengths may be utilized to generate a wide variety of colors of light from the each of the photoluminescent portions (e.g. the first photoluminescent portion 26 and the second photoluminescent portion 30) converted from the first wavelength $\lambda_1$. The third emission 32 may similarly utilize photoluminescent materials to output a color of light different from the first emission 24 and the second emission 28.

Figure 4:
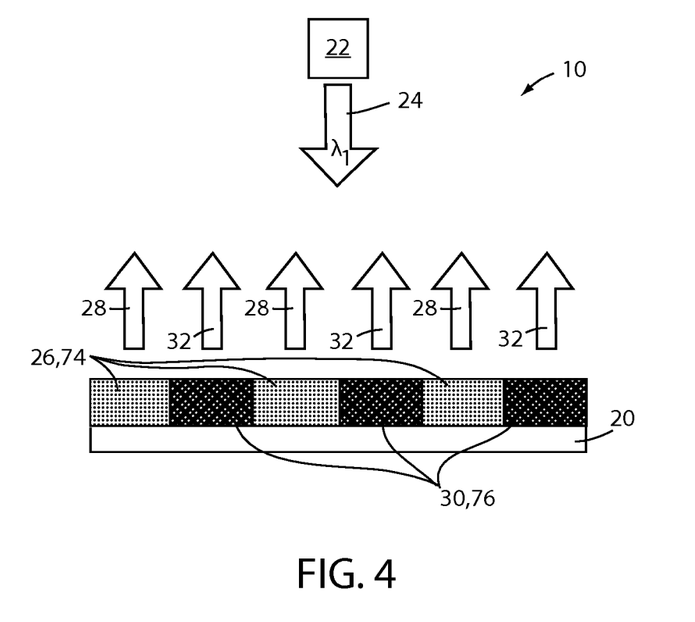
FIG. 4 is schematic view of a front-lit configuration of a lighting apparatus configured to convert a first wavelength of light to a second wavelength and a third wavelength.

Referring to FIG. 4, the lighting apparatus 10 is generally shown according to a front-lit configuration 72 to convert the first emission 24 from the light source 22 to the second emission 28 and the third emission 32. In this configuration, the first emission 24 emitted from the light source 22 is directed toward the fabric portion 18 comprising the first photoluminescent portion 26 and the second photoluminescent portion 30. Upon reaching the fabric portion 18, the first wavelength $\lambda_1$ of the first emission is converted to the second emission 28 by the first photoluminescent portion 26. The first photoluminescent portion 26 may correspond to a plurality of threads or fabric forming a first design portion 74 of the fabric portion 18. The first design portion 74 may form a portion of an embroidered logo or design disposed on the textile surface 20 of the vehicle. In this configuration, the first design portion 74 may be selectively illuminated in response the activation of the light source 22.

In response to receiving the first emission 24, the second photoluminescent portion 30 may also become excited and emit the third emission 32. The second photoluminescent portion 30 may correspond to a plurality of threads or fabric forming a second design portion 76 of the fabric portion 18. The second design portion 76 may form a portion of an embroidered logo or design disposed on the textile surface 20 of the vehicle. In this configuration, the first design portion 74 and the second design portion 76 of the fabric portion 18 may be selectively illuminated in response the activation of the light source 22.

The second emission 28 having at least the second wavelength $\lambda_2$ may correspond to a first color 78 of light. The third emission 32 having at least the third wavelength $\lambda_3$ may correspond to a second color 80 of light. In this configuration, the fabric portion 18 may be illuminated in an ambient glow emitted from each of the first design portion 74 and the second design portion 76 to generate a multicolored design. The first color 78 may be generated by a first photoluminescent material and the second color may be generated by a second photoluminescent material. Each of the photoluminescent materials may comprise various combinations of photoluminescent materials. The first photoluminescent material and the second photoluminescent material may be disposed in the first photoluminescent portion 26 and the second photoluminescent portion respectively.

Though the second wavelength $\lambda_2$ and the third wavelength $\lambda_3$ are referred to as specific wavelengths, each may comprise a plurality of wavelengths of light corresponding to the first color 78 and the second color 80. In order to generate the plurality of wavelengths, the energy conversion layer 44 of each of the photoluminescent portions 26 and 30 may comprise one or more photoluminescent materials configured to emit wavelengths of light in the red, green, blue, and any combinations thereof. For example, photoluminescent materials may be combined to generate a wide variety of colors of light for the second emission 28 and the third emission 32. For example, the red, green, and blue-emitting photoluminescent materials may be utilized in a variety of proportions and combinations to control the first color 78 and the second color 80 to produce a desired illumination effect for the fabric portion 18.

Figure 5A:
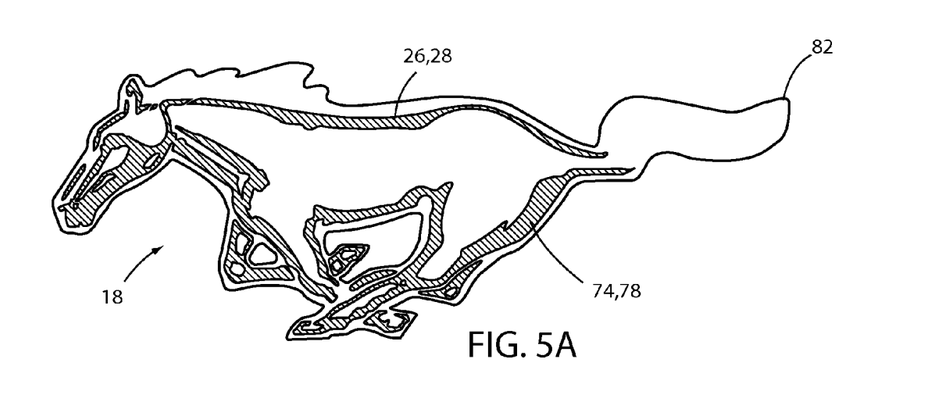
FIG. 5A is a detailed view of a fabric portion demonstrating a first photoluminescent portion disposed on a vehicle surface.
Figure 5B:
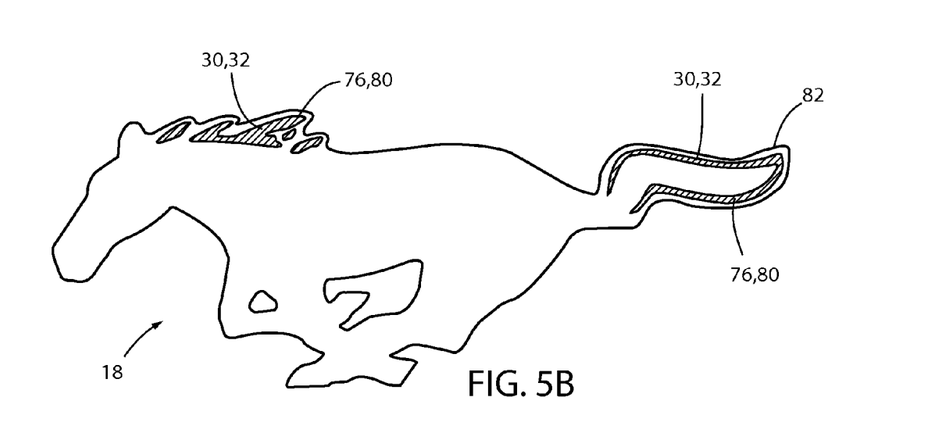
FIG. 5B is a detailed view of a fabric portion demonstrating a second photoluminescent portion disposed on a vehicle surface.
Figure 5C:
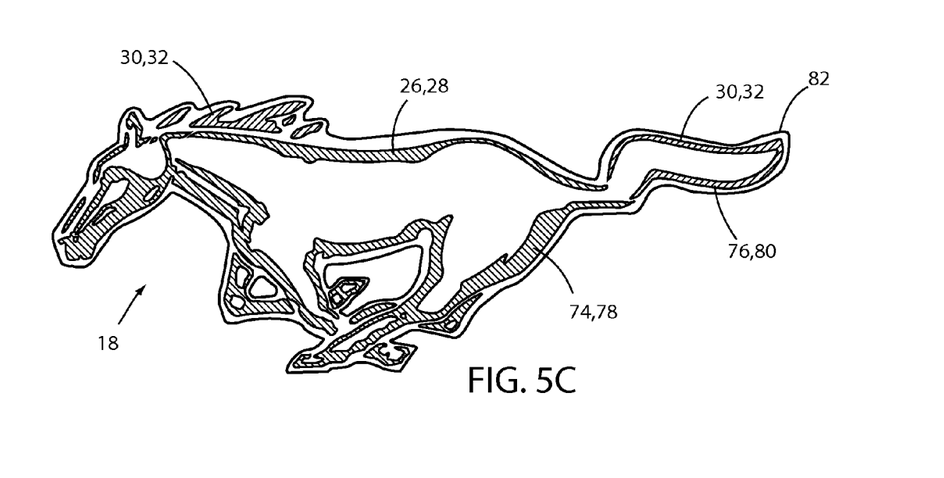
FIG. 5C is a detailed view of a fabric portion demonstrating a first photoluminescent portion and a second photoluminescent portion disposed on a vehicle surface.

Referring to FIGS. 5A-5C, the first photoluminescent portion 26 and the second photoluminescent portion 30 are shown corresponding to the first design portion 74 and the second design portion 76 of the fabric portion 18 respectively. FIG. 5A demonstrates the first photoluminescent portion 26 incorporated into the first design portion 74. In response to the first emission 24 directed from the light source 22 reaching the first photoluminescent portion 26, the second emission 28 may be emitted from the first design portion 74 to illuminate the first design portion 74 in the first color 78. FIG. 5B demonstrates the second photoluminescent portion 30 incorporated into the second design portion 76. The second photoluminescent portion 30 may be activated similarly to the first photoluminescent portion 26 in response to receiving the first emission 24 to illuminate the second design portion 76 in the second color 80.

FIG. 5C demonstrates the first photoluminescent portion 26 and the second photoluminescent portion 30 both illuminated in response receiving the first emission 24 from the light source 22. In FIGS. 5A-5C, the first design portion 74 and the second design portion 76 correspond to substantially distinct portions of the fabric portion 18 for clarity. In some implementations, the first design portion 74 and the second design portion 76 may correspond to regions of the fabric portion 18 that are partially and/or completely overlapping. In such implementations, the first photoluminescent portion 26 may correspond to a first photoluminescent material applied as a coating, dispersed in, and/or applied as a treatment to a first thread. The first thread may be utilized to produce a first embroidered portion corresponding to the first design portion 74.

Similarly, the second design portion 76 may correspond to a second photoluminescent material applied as a coating, dispersed in, and/or applied as a treatment to a second thread. The second thread may be utilized produce a second embroidered portion corresponding to the second design portion 76. In this configuration, each of the photoluminescent portions 26 and 30 may be selectively illuminated in response receiving the first emission 24 to illuminate the fabric portion 18 in the first color 78 and the second color 80. In this example, each of the photoluminescent portions 26 and 30 may be configured to illuminate the fabric portion 18 by converting the first emission 24 to the second emission 28 and the third emission 32, respectively.

As discussed herein, each of the photoluminescent portions (e.g. 26 and 32) may correspond to a thread configured to emit a wavelength corresponding to a color of light in response to an excitation resulting from the receipt of the first emission 24. However, in some cases, the first wavelength of the first emission 24 may be received by the photoluminescent portions in the form of environmental light, for example sunlight. Environmental light may correspond to broad spectrum light having wavelengths ranging from the ultraviolet scale to the infrared scale. Hence, the environmental light may excite the photoluminescent portions similar to the first emission 24.

In many cases, though the wavelength of light corresponding to the first emission 24 is received by the photoluminescent portions (e.g. 26 and 32) other wavelengths of the environmental light may limit the visibility of the resulting emissions from the photoluminescent portions. Depending on the concentrations and color(s) of the photoluminescent materials utilized in the photoluminescent portions, the environmental light may cause the fabric portion to change in color due to the Stokes shifts resulting in the luminescence of the photoluminescent portions. In such instances, each of the photoluminescent portions and the corresponding portions of the fabric portion 18 may be color corrected to ensure that the fabric portion maintains a desired appearance and color scheme when the photoluminescent portions are subject to environmental light.

The color correction of the photoluminescent portions (e.g. 26 and 32) may include changing a color of the thread or fabric corresponding thereto. As discussed herein, the light source 22 may be configured to emit substantially blue light having a wavelength of approximately 430-525 nm. In such implementations, the photoluminescent portions may cause the corresponding portions of the fabric portion 18 to appear to have less blue color due to the effect of the Stokes shift on the light reflected from the photoluminescent portions. In order to compensate for the Stokes shift, each of the fabric or thread portions comprising the photoluminescent portions may be color corrected, for example by adding additional blue pigment to the corresponding fabric or threads. In this way, the photoluminescent portions may appear to match and blend to a desired color scheme when exposed to environmental light, such as sunlight.

Referring now to FIGS. 1 and 5A-5C, an implementation of the lighting apparatus 10 may utilize a plurality of light sources to selectively illuminate the first photoluminescent portion 26 and the second photoluminescent portion 30. The plurality of light sources may correspond to a first light source 22a and a second light source 22b. The first light source 22a may be configured to emit the first excitation emission 24a and the second light source 22b may be configured to emit a second excitation emission 24b. The first excitation emission 24a may be referred to as a first excitation wavelength $\lambda_{1a}$ having a wavelength value configured to target a first absorption range of the first photoluminescent portion 26. The second excitation emission 24b may be referred to as a second excitation wavelength $\lambda_{1b}$ having a wavelength value configured to target a second absorption range of the second photoluminescent portion 30.

In response receiving the first excitation emission 24a, the first design portion 74 may be illuminated in response to receiving the first excitation wavelength $\lambda_{1a}$ being converted to the second emission 28. In response to the first excitation wavelength $\lambda_{1a}$, the first design portion 74 of the fabric portion may illuminate the fabric portion 18 as shown in FIG. 5A. In response receiving the second excitation emission 24b, the second design portion 76 may be illuminated in response to receiving the second excitation wavelength $\lambda_{1b}$. The second excitation wavelength $\lambda_{1b}$ is converted to the third emission 32 to illuminate the fabric portion 18 as shown in FIG. 5B. In this way, the first photoluminescent portion 26 and the second photoluminescent portion 30 may be selectively illuminated in response to the activation of the first light source 22a and the second light source 22b substantially independent of each other. Each of the light sources 22, 22a, and 22b may be controlled by a controller of the lighting system 12 as discussed in reference to FIG. 6.

The first light absorption range and the second light absorption range may correspond to ranges of wavelengths of light operable to excite the first photoluminescent portion 26 and the second photoluminescent portion, respectively. A first photoluminescent material having the first absorption range may be utilized to form the first photoluminescent portion 26 and a second photoluminescent having the second absorption range material may be utilized to form the second photoluminescent portion 30. Each of the light absorption ranges may correspond to a distinct or partially overlapping range of wavelengths that may be in the blue or near UV light range and approximately less than 500 nm.

For example, the first absorption range may correspond to an absorption range of a first rylene dye configured to convert wavelengths of light ranging from approximately 470-500 nm to output the second emission 28 in a green color. The second absorption range may correspond to absorption range of a second rylene dye configured to convert wavelengths of light ranging from approximately 450-485 nm to output the third emission 32 in a red color. In this configuration, each of the excitation light sources 22a and 22b is configured to illuminate the first photoluminescent portion 26 and the second photoluminescent portion 30 respectively approximately independently of each other. That is, the first excitation light source 22a may be configured to have the first excitation wavelength $\lambda_{1a}$ of approximately 490 nm, and the second excitation light source 22b may be configured to have the second excitation wavelength $\lambda_{1b}$ of approximately 470 nm. In this configuration, the lighting system 12 may be operable to selectively illuminate the first photoluminescent portion 26 and the second photoluminescent portion 30 substantially independent of each other.

Though demonstrated as spatially distinct portions of the fabric portion 18 in FIGS. 5A-5C, the first photoluminescent portion 26 and the second photoluminescent portion 30 may be partially overlapping or completely overlapping. In some implementations, the photoluminescent portions may be configured to create a motion effect in response to an alternating excitation resulting from the selective activation of the first excitation light source 22a and the second excitation light source 22b. In this configuration, the lighting system 12 may be operable to generate a motion effect by selectively activating each of the photoluminescent portions.

For example, the first photoluminescent portion 26 and the second photoluminescent portion 30 may correspond to partially overlapping portions of a motion region 82. In this particular example, the motion region may correspond to a tail of a horse. By partially overlapping the first photoluminescent portion 26 and the second photoluminescent portion 30 in the motion region 82, the photoluminescent portions may be selectively illuminated. The selective activation of the photoluminescent portions may be controlled by the lighting controller by selectively illuminating the first excitation light source 22a and the second excitation light source 22b to create a motion effect. The motion effect in this particular example may correspond to the tail of the horse appearing to sway as though it was rustling in the wind. In this configuration, the motion effect may be selectively activated by the lighting controller in response to a vehicle state corresponding to one or more status signals received by the lighting controller.

Figure 6:
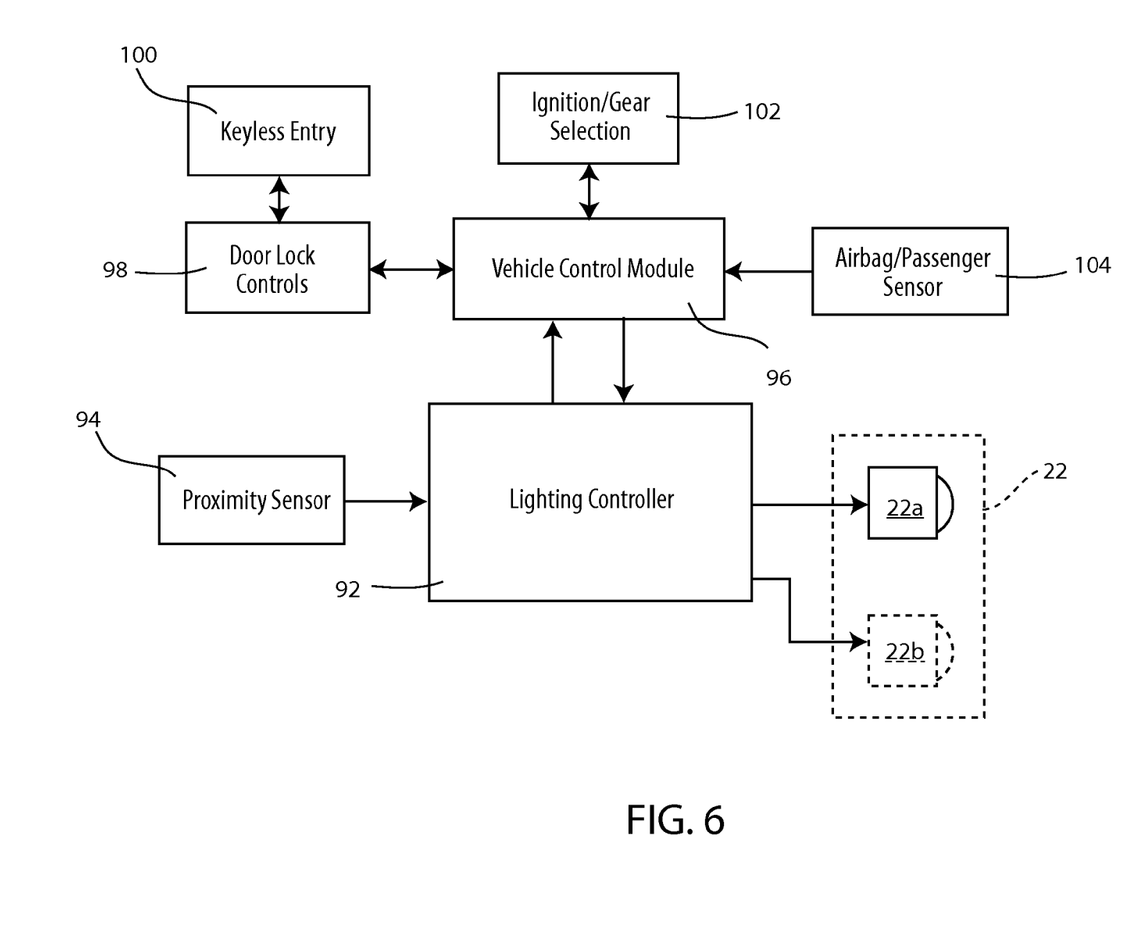
FIG. 6 is a block diagram of a lighting controller configured to control the lighting system in accordance with the disclosure.

Referring to FIG. 6, a block diagram of a lighting controller 92 of the lighting system 12 is shown. The lighting controller 92 may comprise one or more circuits and/or processors configured to control the light source 22 or the plurality of light sources (e.g. 22a and 22b) as discussed herein. The lighting controller 92 may be operable to selectively illuminate each of the light sources 22a and 22b and control an intensity of a corresponding emission (e.g. 24a and 24b) emitted from the light sources 22a and 22b. In this way, the controller 92 may be operable to control the illumination of the first photoluminescent portion 26 and the second photoluminescent portion 28 independently.

The lighting controller 92 may be in communication with a proximity sensor 94 configured to detect the presence of a passenger in the passenger seat 38. In response to the detection of the passenger, the lighting controller 92 may deactivate the light sources 22a and 22b. In this way, an excitation emission emitted from at least one of the light sources may not distract the passenger of the vehicle. The lighting controller 92 may further be in communication with a control module 96. The control module 96 may provide signals and communication to the lighting controller 92 from various vehicle systems.

Vehicle systems in communication with the lighting controller 92 via the control module 92 may correspond to one or more status signals of the vehicle. Status signals may include, for example, door lock controls 98, keyless entry 100, an ignition control/gear selection 102, and an airbag or passenger sensor 104. In this configuration, the lighting controller 92 may be operable to selectively control the emissions of light from the light sources 22a and 22b in response to a status or signal corresponding to any of the door lock controls 98, the keyless entry 100, the ignition/gear selection 102, and the airbag or the passenger sensor 104. For example, the light sources 22a and 22b may be activated by the controller 92 in response to the doors of the vehicle being unlocked. The light sources 22a and 22b may remain active to illuminate the first photoluminescent portion 26 and/or the second photoluminescent portion 28 until an occupant is detected by the proximity sensor 104 corresponding to a specific seat on which the passenger is seated.

The proximity sensor 94 may be operable to detect an occupant positioned in the passenger compartment 8 of the vehicle. Some examples of sensors that may correspond to the proximity sensors may include capacitive sensors, pressure sensors, infrared sensors, and any other form of sensors operable to detect the presence of a person, animal, or other vehicle passengers. In some implementations, the light sources 22a and 22b may be deactivated in response to the proximity sensor 94 communicating to the lighting controller 92 that an occupant presence has been detected. Similarly, the lighting controller 92 may be operable to deactivate the light sources 22a and 22b in response to receiving a signal from the passenger sensor 104 identifying that a passenger is seated in the passenger compartment 8.

Though the lighting controller 92 is discussed in reference to the plurality of light sources 22a and 22b, the lighting controller 92 may similarly be utilized to control the light source 22. The lighting controller 92 discussed herein may be operable to control an activation and intensity of the light emitted from each of the light sources 22a and 22b. The intensity of the light emitted from each of the light sources 22a and 22b may be controlled by adjusting the magnitude of the voltage or current supplied, and/or varying a duty cycle of a control signal supplied to each of the light sources 22a and 22b. In this way, the controller 92 is operable to activate and control the light sources 22a and 22b in response to the status signal received from the control module 96 and adjust the intensity of the light emitted from each of the first photoluminescent portion and the second photoluminescent portion to selectively illuminate the fabric portion 18.

The lighting system, as described herein, may provide various benefits including a cost-effective system operable to provide a decorative ambient lighting within a passenger compartment of a vehicle. The various implementations described herein including the particular locations and configurations of each of the photoluminescent portions may vary without departing from the spirit of the disclosure. The subject matter of the instant disclosure provides for a lighting apparatus for illuminating a fabric portion of a vehicle. The various implementations discussed herein may provide for selective activation of at least one photoluminescent portion disposed in a vehicle to produce various lighting effects.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illumination apparatus for a vehicle comprising:
   at least one fabric portion comprising thread treated with a photoluminescent material disposed on a textile surface of the vehicle, the at least one fabric portion comprising a first photoluminescent portion having a first luminescent absorption range and a second photoluminescent portion comprising a second luminescent absorption range; and
   a first light source configured to emit a first emission at a first wavelength, wherein the first wavelength is within the first absorption range and significantly outside the second absorption range.

2. The illumination apparatus according to claim 1, wherein the first luminescent absorption range corresponds to a different range of wavelengths of light than the second absorption range.

3. The illumination apparatus according to claim 1, further comprising:
   a second light source configured to emit a second emission at a second wavelength different than the first wavelength and within the second absorption range.

4. The illumination apparatus according to claim 3, wherein the first photoluminescent portion is configured to emit a third emission in response to the first emission.

5. The illumination apparatus according to claim 4, wherein the second photoluminescent portion is configured to emit a fourth emission in response to the second emission.

6. The illumination apparatus according to claim 5, wherein the second wavelength is within the second absorption range such that the second photoluminescent portion emits a fourth emission.

7. The illumination apparatus according to claim 3, further comprising:
   a controller in communication with the first and second light sources, wherein the controller is configured to selectively illuminate each of the first and second light sources.

8. The illumination apparatus according to claim 7, wherein the controller is configured to control the first emission and the second emission such that at least a section of each of the first photoluminescent portion is selectively illuminated substantially independent of an illumination of the second photoluminescent portion.

9. A lighting system configured to illuminate a fabric portion of a vehicle comprising:
a light source configured to emit a first emission having a first wavelength; and
a thread treated with a photoluminescent material and disposed on a textile surface of the vehicle, wherein the first emission is directed toward the thread such that the thread emits a second emission having a second wavelength.

10. The lighting system according to claim 9, wherein the thread is embroidered into the textile and the textile corresponds to an upholstery of the vehicle.

11. The lighting system according to claim 9, wherein the light source is selectively activated in response to an object detection of a proximity sensor.

12. The lighting system according to claim 9, wherein the light source is selectively activated in response to at least one vehicle status.

13. The lighting system according to claim 12, wherein the vehicle status corresponds to at least one of a door ajar status, an ignition status of the vehicle, and a gear selector status.

14. A lighting system for a vehicle comprising:
a controller in communication with a light source configured to emit a first emission having a first wavelength; and
a first thread treated with a first photoluminescent material and disposed on a textile surface of the vehicle, wherein the first emission is directed toward the first thread such that the first thread emits a second emission having a second wavelength.

15. The lighting system according to claim 14, wherein the first thread corresponds to an embroidered feature disposed on the textile surface.

16. The lighting system according to claim 14, wherein the textile corresponds to a portion of upholstery of the vehicle.

17. The lighting system according to claim 15, further comprising a second light source configured to emit a third wavelength of light directed toward the embroidered feature.

18. The lighting system according to claim 15, wherein the embroidered feature further comprises a second thread treated with a second photoluminescent material.

19. The lighting system according to claim 18, wherein the second photoluminescent material is configured to emit a fourth emission having fourth wavelength in response to receiving the third emission having a third wavelength.

20. The lighting system according to claim 19, wherein at least one of the first thread and the second thread is color corrected such that environmental light reflected therefrom generates a desired appearance.

* * * * *